(12) United States Patent
Hinz et al.

(10) Patent No.: US 6,386,646 B1
(45) Date of Patent: May 14, 2002

(54) HYDRAULIC BRAKE SYSTEM WITH A RECIRCULATING PUMP

(75) Inventors: Axel Hinz, Neu-Anspach; Erhard Beck, Weilburg; Michael Jung, Limburg; Hans-Dieter Reinartz, Frankfurt am Main, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/214,351

(22) PCT Filed: Jun. 24, 1997

(86) PCT No.: PCT/EP97/03297

§ 371 Date: Oct. 21, 1999

§ 102(e) Date: Oct. 21, 1999

(87) PCT Pub. No.: WO98/00323

PCT Pub. Date: Jan. 8, 1998

(30) Foreign Application Priority Data

Jul. 1, 1996 (DE) ......................... 196 26 289

(51) Int. Cl.[7] .............................. B60T 13/18
(52) U.S. Cl. ..................... 303/11; 303/116.1
(58) Field of Search ............... 303/11, 116.1, 303/116.2

(56) References Cited

U.S. PATENT DOCUMENTS

| | | | | |
|---|---|---|---|---|
| 4,779,935 A | * | 10/1988 | Kuwana et al. | 303/116 |
| 5,947,566 A | * | 9/1999 | Tobisawa et al. | 303/114.1 |

FOREIGN PATENT DOCUMENTS

| | | | |
|---|---|---|---|
| DE | 33 37 545 | | 4/1985 |
| DE | 40 25 859 | | 2/1992 |
| DE | 40 39 661 | | 6/1992 |
| DE | 41 27 040 | | 2/1993 |
| DE | 43 19 161 | | 12/1994 |
| DE | 43 29 140 | | 12/1994 |
| DE | 4431474 | * | 3/1996 ............. 303/116.1 |
| EP | 361 502 | | 9/1989 |
| EP | 606 840 | | 1/1994 |
| WO | 92/18363 | | 10/1992 |
| WO | 96 10 507 | | 4/1996 |

OTHER PUBLICATIONS

Patent Abstracts of Japan vol. 018, No. 335 (M–1627), Jun. 24, 1994 & JP 06 080071 A (Sumitomo Electric Ind Ltd), Mar. 22, 1994, siehe Zusammenfassung; Abbildungen 1,2, 5,6.

German Search Report for German Appl. No. 196 26 289.5.

* cited by examiner

Primary Examiner—Christopher P. Schwartz
Assistant Examiner—Xuan Lan Nguyen
(74) Attorney, Agent, or Firm—Rader, Fishman & Grauer PLLC

(57) ABSTRACT

A hydraulic brake system with anti-lock control comprises a main cylinder connected to a reservoir, wheel brakes connected to the main cylinder by way of brake lines, and a recirculating pump, a suction side of which is connected to the wheel brakes by way of a first suction line. By way of a second suction line, the pump is connected to a pressure source. To control the pressure medium supply from a precharging device or other pressure source to the suction side of the recirculating pump as a function of the pressure in the second suction line, a hydraulically actuated valve is used. The inlet of the valve is connected to the precharging device via the pressure source, the outlet of the valve is connected to the suction side of the recirculating pump. The output pressure of the valve acts in a valve closing direction such that the valve closes once a pressure on the suction side of the recirculating pump exceeds a certain value. Thus, pressure medium supply is controlled as a function of the pressure on the suction side of the recirculating pump rather than the pressure at the valve inlet, to thereby limit the pressure on the suction side and to consequently subject the pump to less wear.

9 Claims, 1 Drawing Sheet

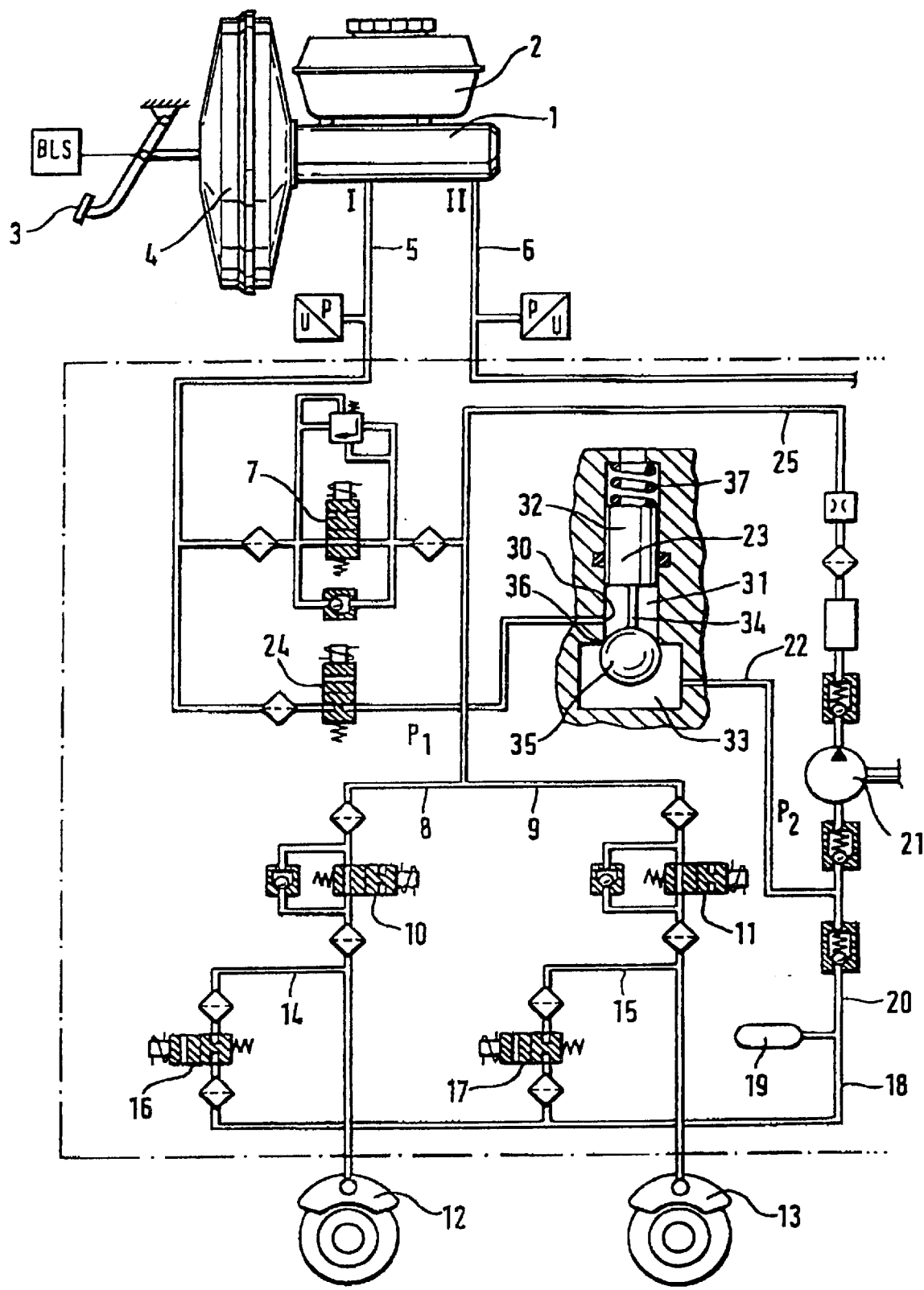

HYDRAULIC BRAKE SYSTEM WITH A RECIRCULATING PUMP

TECHNICAL FIELD

The present invention relates to hydraulic brake systems and more particularly relates to anti-lock brake systems.

BACKGROUND OF THE INVENTION

A brake system of this type is known from German Patent No. 4,025,859 A1, for example. In this known brake system, the brake circuit is divided into a front axle brake circuit and a rear axle brake circuit, wherein one brake circuit is assigned to the nondriven axle and the other brake circuit is assigned to the driven axle. The brake circuit of the driven axle is equipped with a traction control device. A traction control represents an active braking maneuver because the braking process is initiated without vehicle operator actuation of the brake pedal. Other types of active braking maneuvers are braking processes for controlling the yaw moment, for example, without participation of the driver or in addition to a pedal-actuated braking maneuver.

During an anti-lock braking maneuver, the known brake system operates in accordance with the recirculation principle, wherein the brake system is equipped with a precharging pump for the recirculating pump. The suction side of the precharging pump is connected to the reservoir of the brake system, and the pressure side is connected to the suction side of the recirculating pump via a hydraulically actuated on-off valve. Once the delivery pressure of the recirculating pump reaches the maximum pressure of the brake system during a traction control maneuver, the conveyed pressure medium flows through a pressure limiting valve and into the control line for the hydraulically actuated on-off valve arranged between the precharging pump and the recirculating pump. During the subsequent traction control, no precharging volume is advanced to the recirculating pump until the pressure in the control line has decreased to such a level that the on-off valve opens again. The purpose of this measure is that one attempts to prevent the unnecessary conveyance of the pressure medium through the recirculating pump. The recirculating pump should only generate a pressure upon demand. Consequently, excess pressure medium is not discharged into the reservoir of the brake system via a pressure control valve, but the suction side of the recirculating pump is blocked until the delivery of the pressure medium is required again.

A precharging pressure source represents one of the possible pressure sources for at least temporarily building up an increased pressure on the suction side of the recirculating pump. Other options for precharging a regenerative or nonregenerative recirculating pump are the utilization of an active vacuum brake booster, an additional pressure reservoir or, for example, a precharging device arranged between the reservoir and the main cylinder. In the latter instance, the volume flowing into the brake line through the main cylinder is used for precharging the recirculating pump when the brake pedal is not actuated.

It is also possible for a pressure source other than a precharging device to build up the pressure on the suction side of the recirculating pump. Brake systems, the second suction line of which branches off the brake line above a block valve, are only able to isolate the main cylinder pressure from the suction side of the recirculating pump if the second suction line is blocked. However, this only takes place after a pedal-actuated braking maneuver has been detected in the active braking mode, i.e., once the main cylinder pressure is able to propagate to the suction side of the recirculating pump.

In all aforementioned constructions, the recirculating pump is highly stressed and consequently subjected to premature wear by the precharging device in the active braking mode or by the pressure acting upon the recirculating pump from another pressure source. In extreme instances, large leaks can lead to the failure of the electric motors for the pumps. However, a submersible design of the electric motor would be associated with significant expenditures.

The present invention is based on the objective of developing a hydraulic brake system in which the recirculating pump is subjected to less wear.

The basic principle of the invention consists of limiting the pressure on the suction side of the recirculating pump to the required level. With respect to blocking the pressure medium supply, the delivery pressure of the recirculating pump is no longer decisive, but rather the pressure on the suction side of said recirculating pump.

In order to limit the pressure on the suction side of the pump, a hydraulically actuated valve is preferably utilized because a valve of this type requires no separate control logic and no electric lines. Such a valve need not contain any effective surfaces for the pressure medium in the valve opening direction because the output pressure which acts in the closing direction is automatically built up due to the activity of the recirculating pump such that the valve is opened.

BRIEF DESCRIPTION OF THE DRAWINGS

The FIGURE shows a brake system according to the invention with a hydraulically actuated on-off valve arranged in the connection between the precharging source and the recirculating pump.

DETAILED DESCRIPTION OF THE PREFERRED EMBODIMENTS

The brake system shown contains a main cylinder 1 that is connected to a reservoir 2 and actuated by a brake pedal 3 via a vacuum brake booster 4. The brake booster 4 is realized in the form of an active brake booster, i.e., it is able to displace the actuating piston of the main cylinder 1 and build up a certain pressure in the brake system by means of electric control, i.e., without an actuation of the brake pedal 3 of the brake booster 4. Two brake lines 5 and 6 extend from the main cylinder 1 to the respective brake circuits. Only the brake circuit I is illustrated in detail, wherein the other brake circuit II is realized identically or, for example, merely provided with an anti-lock device if the brake system is equipped with a traction control and the brake circuit is divided into a front axle brake circuit and a rear axle brake circuit. This means that the brake circuit I extends from the main cylinder 1 to the wheel brakes 12 and 13 via the brake line 5, a block valve 7 and two branch lines 8 and 9 which respectively contain one inlet valve 10 or 11. One respective return branch line 14 or 15 extends from the wheel brakes 12 and 13 to a return line 18, to which a low-pressure reservoir 19 is connected, via one respective outlet valve 16 or 17. The low-pressure reservoir 19 is connected to the suction side of a regenerative recirculating pump 21 via a first suction line 20. The recirculating pump contains a second suction line 22, in which a hydraulically actuated on-off valve 23 as well as an electromagnetically actuated reversing valve 24 is inserted. The second suction line 22 is connected to the brake line 5 between the main cylinder 1 and the block valve 7. A pressure line 25 connects the pressure side of the recirculating pump 21 to the brake line 5 between the block valve 7 and the inlet valves 10 and 11.

During a normal braking maneuver, i.e., when the brake system is actuated via the pedal and no critical slip values or other critical dynamic factors are present, all valves remain in the position shown except the hydraulically actuated on-off valve 23 which is shown in its switching position. In its normal position and during a pedal-actuated braking maneuver, the valve is open. The pressure in the wheel brakes 12 and 13 is built up via the brake line 5 and the branch lines 8 and 9, wherein the pressure is also relieved via this path.

During an anti-lock braking maneuver, the brake system operates in accordance with the known recirculation principle. The electromagnetic reversing valve 24 remains closed, and the block valve 7 remains open. Only the inlet valves 10 and 11 and the outlet valves 16 and 17 are controlled in conventional fashion so as to regulate the pressure in the wheel brakes 12 and 13. The recirculating pump 21 displaces the pressure medium discharged into the low-pressure reservoir 19 back into the brake line 5, i.e., between the block valve 7 and the inlet valves 10 and 11, via the pressure line 25. During an active braking maneuver, e.g., a traction control maneuver or an active braking maneuver in order to control the yaw moment, the block valve 7 is closed and the electromagnetically actuated reversing valve 24 is open. The brake booster 4 actuates the main cylinder 1 such that a pressure medium pressure propagates in the second suction line 22 up to the hydraulically actuated on-off valve 23 via the brake line 5 and the electromagnetically actuated reversing valve 24.

The hydraulically actuated on-off valve 23 is realized in such a way that the pressure medium inlet 30 ends in an inlet chamber 31 that is limited by a piston 32 on one side and opens into an outlet chamber 33 of larger cross section on the other side. A valve tappet 34 that carries a valve closing element 35 is mounted on the piston 32. The valve closing element is arranged in the outlet chamber 33 and has a larger diameter than the piston 23. The valve seat 36 that forms the transition between the inlet chamber 31 and the outlet chamber 33 has the same cross section as the piston 32. A compression spring 37 acts on the side of the piston 32 which faces away from the closing element 35 in the valve opening direction. The piston 32 is subjected to the atmospheric pressure on this side.

During a precharging by the active brake booster 4, a certain pressure is built up in the inlet chamber 31 and in the outlet chamber 33 due to the open valve. Once this pressure multiplied by the cross-sectional area of the valve seat 36 exceeds the force of the compression spring 37, the piston 32 moves toward the compression spring 37 such that the closing element 35 adjoins the valve seat 36. This means that the on-off valve 23 is closed. During this process, the pressure in the outlet chamber 33 continues to act in the closing direction, wherein the inlet chamber 31 contains no effective surfaces that could displace the piston 32.

Since the recirculating pump 21 permanently generates suction, the pressure in the outlet chamber 33 is reduced again such that the hydraulic on-off valve 23 is opened again.

However, the precharging pressure for the recirculating pump 21 can never exceed the closing pressure of the on-off valve 23. Thus, the recirculating pump is protected because it is always subjected to a low precharging pressure. However, it is ensured that a sufficient precharging volume is always available because the valve automatically opens on demand.

At this point, it should be noted that such a hydraulically actuated on-off valve 23 is only sensible for a brake system that is equipped with a precharging device. For example, it would be conceivable if the driver of the motor vehicle suddenly actuated the brake pedal 3 in the active braking mode without precharging and while the electrically actuated reversing valve 24 was open. In this case, a high braking pressure would also be able to propagate into the second suction line 22. In such instances, the hydraulically actuated reversing valve 23 isolates pressure peaks from the suction side of the recirculating pump 21. This applies to brake systems, the second suction line 22 of which is connected to the brake line 5. However, there also exist other brake systems which are equipped with hydraulic pressure sources, the pressure of which at least temporarily propagates into the second suction line 22. The hydraulically actuated on-off valve 23 should be used in all brake systems of this type.

A hydraulically actuated reversing valve of the type described above is also able to prevent excess pressure from being built up during a precharging process if the precharging is not realized via the brake line, but rather a separate precharging pump which conveys the pressure medium directly from the reservoir 2 into the second suction line 22. In this case, the second suction line naturally would not be connected to the brake line 5.

What is claimed is:

1. A hydraulic brake system adapted for performing active braking maneuvers, said system comprising:

a main cylinder connected to a fluid reservoir;

a precharging device connected to the main cylinder;

at least one wheel brake connected to the main cylinder by a brake line;

a recirculating pump having a suction side connected to the wheel brake by a first suction line, the suction side of the recirculating pump being at least temporarily connected to the main cylinder by a second suction line; and a hydraulically actuated on-off valve arranged in the second suction line between the main cylinder and the recirculating pump, the hydraulically actuated valve having an inlet chamber connected to the precharging device, and an outlet chamber connected to the suction side of the recirculating pump, wherein the outlet chamber has a large cross sectional area than the inlet chamber such that a fluid pressure in the inlet chamber and a fluid pressure in the outlet chamber is increased to a predetermined value when the hydraulically actuated on-off valve is open to cause the hydraulically actuated on-off valve to close, and wherein the fluid pressure in the outlet chamber continues to keep the hydraulically actuated on-off valve closed until the fluid pressure in the outlet chamber is decreased to the predetermined value to cause the hydraulically actuated on-off valve to open, and wherein the hydraulically actuated on-off valve prevents a precharging pressure for the recirculating pump from exceeding the predetermined value of the fluid pressure in the outlet chamber of the hydraulically actuated on-off valve, whereby the recirculating pump is subjected to less wear.

2. The hydraulic brake system according to claim 1, further including a block valve connected between the main cylinder and the at least one wheel brake, and a reversing valve connected between the main cylinder and the inlet chamber of the hydraulically actuated on-off valve.

3. The hydraulic brake system according to claim 2, wherein the block valve is open and the reversing valve is closed such that the hydraulically actuated on-off valve is bypassed during a normal braking operation.

4. The hydraulic brake system according to claim 2, wherein the block valve is closed and the reversing valve is open such that the inlet chamber of the hydraulically actuated on-off valve is in fluid communication with the pre-charging device during a traction control maneuver.

5. The hydraulic brake system according to claim 2, wherein the hydraulically actuated on-off valve includes a spring for providing a biasing force to a closing element.

6. The hydraulic brake system according to claim 5, wherein the hydraulically actuated on-off valve is closed when the predetermined value of the fluid pressure in the outlet chamber exceeds the biasing force of the spring.

7. The hydraulic brake system according to claim 5, wherein the hydraulically actuated on-off valve is open when the predetermined value of the fluid pressure in the outlet chamber does not exceed the biasing force of the spring.

8. The hydraulic brake system according to claim 5, wherein the hydraulically actuated on-off valve further includes a piston having a larger cross sectional area than the closing element such that the inlet chamber contains no effective surfaces for displacing the piston when the hydraulically actuated on-off valve is closed.

9. The hydraulic brake system according to claim 2, further including a fluid reservoir connected to the suction side of the recirculating pump by the first suction line.

* * * * *